US008718808B2

(12) United States Patent
Copello et al.

(10) Patent No.: US 8,718,808 B2
(45) Date of Patent: May 6, 2014

(54) METHOD AND A SYSTEM FOR PROPAGATING A SCALING MODE IN A PRODUCTION PROCESS

(75) Inventors: Paolo Copello, Rapallo IT (IT); Alessandro Raviola, Genoa (IT); Federico Risso, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 967 days.

(21) Appl. No.: 12/834,291

(22) Filed: Jul. 12, 2010

(65) Prior Publication Data

US 2011/0060440 A1      Mar. 10, 2011

(30) Foreign Application Priority Data

Sep. 7, 2009   (EP) .................................... 09169597

(51) Int. Cl.
*G06F 19/00*      (2011.01)
*G06Q 10/00*      (2012.01)

(52) U.S. Cl.
USPC ............... 700/99; 700/106; 705/7.12; 705/28

(58) Field of Classification Search
USPC .......... 700/99, 95, 106–108; 705/7.12, 28, 29
See application file for complete search history.

(56) References Cited

U.S. PATENT DOCUMENTS

| 4,827,423 | A | * | 5/1989 | Beasley et al. ................. 700/96 |
| 5,442,561 | A | * | 8/1995 | Yoshizawa et al. ........... 700/100 |
| 6,041,267 | A | * | 3/2000 | Dangat et al. ................. 700/107 |
| 6,950,714 | B2 | * | 9/2005 | Bickley et al. ................ 700/100 |
| 7,072,732 | B2 | * | 7/2006 | Muramatsu et al. .......... 700/103 |
| 7,218,980 | B1 | * | 5/2007 | Orshansky et al. ............. 700/99 |
| 7,474,933 | B2 | * | 1/2009 | Annamaneni et al. ........ 700/108 |
| 2003/0004595 | A1 | * | 1/2003 | Seimiya et al. ................. 700/97 |
| 2003/0229550 | A1 | * | 12/2003 | DiPrima et al. ................. 705/28 |
| 2005/0021164 | A1 | * | 1/2005 | Surholt et al. ................. 700/106 |
| 2005/0131779 | A1 | * | 6/2005 | Kitamura et al. ............... 705/29 |
| 2009/0037012 | A1 | * | 2/2009 | Weigang et al. .............. 700/101 |
| 2009/0319070 | A1 | * | 12/2009 | Morningred et al. ......... 700/103 |

* cited by examiner

*Primary Examiner* — Ronald Hartman, Jr.

(74) *Attorney, Agent, or Firm* — Laurence A. Greenberg; Werner H. Stemer; Ralph E. Locher

(57) ABSTRACT

A method and a system propagate a scaling mode in a production process controlled and executed by a manufacturing executing system (MES). The method includes the steps of providing a production request in terms of an initial quantity of a predetermined product to be produced, identifying the predetermined product by a predetermined production rule thereby dividing the production rule in a number of segment requirements that represent production actions, and defining within the segment requirements resources required to produce the required quantity. A rescaling attribute is defined and is aligned with each of the resources in a production request tree. An interface to the MES is used to update the quantity of the predetermined product to be produced and to recalculate in response to the update, the resources required to produce the updated quantity by applying a rescaling factor calculated from the initial quantity and the updated quantity.

6 Claims, 3 Drawing Sheets

| Production_request_id | quantity |
|---|---|
| Production_request1 | 14 |
| Production_request2 | 34 |

| entry_id | Production_request_id | quantity | duration, Formula ID |
|---|---|---|---|
| Entry1 | Production_request1 | 6 | 122, RA1 |
| Entry2 | Production_request1 | 8 | 50, RA1 |
| Entry3 | Production_request2 | 5 | 23, NULL |

| Production_request_id | quantity |
|---|---|
| Production_request1 | 28 |
| Production_request2 | 34 |

| entry_id | Production_request_id | quantity | duration |
|---|---|---|---|
| Entry1 | Production_request1 | 12 | 224 |
| Entry2 | Production_request1 | 16 | 100 |
| Entry3 | Production_request2 | 5 | 23 |

CT'

METHOD AND A SYSTEM FOR PROPAGATING A SCALING MODE IN A PRODUCTION PROCESS

CROSS-REFERENCE TO RELATED APPLICATION

This application claims the priority, under 35 U.S.C. §119, of European application EP 09169597, filed Sep. 7, 2009; the prior application is herewith incorporated by reference in its entirety.

BACKGROUND OF THE INVENTION

Field of the Invention

The present invention relates to a method and a system for propagating a scaling mode in a production process controlled and executed by a manufacturing executing system (MES).

As it is well known, a method for manufacturing processes planned by an enterprise resource planning (ERP) and produced by a shop floor, provides a manufacturing executing system (MES) for modeling, planning, scheduling and implementing the manufacturing processes and controlling the corresponding production steps at the plant floor level.

In particular, the enterprise resource planning (ERP) is a system including hardware devices and corresponding software applications for planning the business resources of an enterprise, i.e. material provisions, human resource managements, purchasing, orders, profits, finance, inventory controls, customer managements, etceteras, while the term "shop floor" has been used to indicate a system supporting the control of single machines performing production actions and being involved in the manufacturing processes, for example by measuring the number of pieces produced per hour by each machine or the functioning parameters thereof, the quality of the pieces produced and so on.

MES is an intermediate layer providing computing machines and software tools between the ERP upper layer and the shop floor lower layer, including a software tool for production order management, which receives requests of production from the ERP, and a software tool for production modeling, which supports the phases of selecting and managing the resources to be involved in the manufacturing processes, i.e. employees, machines and materials, in order to realize a planned manufacturing process within required time constrains.

Therefore, manufacturing execution systems being regulated by the ANSI/ISA/95 standard require modeling plant equipment for both scheduling and controlling activities. Therefore, the productive process typically consists of a production request which defines a request for production for a single product. The predefined product is identified by a production rule, each of which is divided in many segment requirements that represent simple productive actions which are controlled by the manufacturing execution system.

Thus, a production request contains at least one segment requirement; even it spans all production of the product. A segment requirement contains at least one material produced requirement with the identification, the quantity and the units of measure of the product to be produced. Usually, in MES systems, the user would like to modify the quantity of the product to be produced due to various reasons, such as machine down time, shortage of materials, and absence of personnel. Of course, it would be desirable that the MES system contains a mechanism able to modify all the quantity of the resources involved (e.g. material in input, personnel, equipment) by rescaling the resources involved.

For example, suppose an initial production request of 1,000 kg tomato sauce will require 1,400 kg of tomatoes, 100 kg of Basil and 20 kg of salt and other spices. The user plans this production request and after start of the execution of this production process a shortage of tomatoes shows up, for example only 700 kg of tomatoes are available due to the failure of a new delivery in time. Now, the user has to update the initial production request from 1,000 kg tomato sauce to 500 kg tomato sauce which will now require to change all the other resources involved such as 700 kg tomatoes, 50 kg Basil and 10 kg of salt and other spices. Further, also some equipment can be made re-available for other production requests since for example the cooking station is only used for 30 min instead of 60 minutes. Sometimes the simple linear rescaling as given in this example does not reflect the true situation on the resources involved and a more complex calculation needs to be performed.

Up to now, a modification or an update of the quantity of resources required to produce a product at an updated quantity in a MES can be carried out calling a set of user interface method. The formula used to modify the quantities of the different resources which are involved in the production request will be stored inside the MES system who should apply this formula with a call to a user interface method. In complex MES systems, different formulas should be stored and must be applied depending on the proper situation. This approach leads to the MES system having a collection of formulas to be applied at different levels. Each resource requiring an update of the quantities will be involved in calling the user interface method with the proper formula. The result of this approach produces correct results but when the production process controlled by the MES system involves all the complexity possible, the performance of the entire system has to be decreased due to the user interface method.

SUMMARY OF THE INVENTION

It is accordingly an object of the invention to provide a method and a system for propagating a scaling mode in a production process controlled and executed by a manufacturing executing system which overcome the above-mentioned disadvantages of the prior art methods and devices of this general type, which takes away the burden from the MES system to provide appropriate scaling propagation within the MES system allowing to recover a better performance of the manufacturing execution process.

With respect to the method the objective is achieved according to the present invention by a method for propagating a scaling mode in a production process controlled and executed by a manufacturing executing system (MES). The method including the steps of:

a) providing a production request in terms of a quantity of a predetermined product to be produced;

b) identifying the predetermined product by a predetermined production rule thereby dividing the production rule in a number of segment requirements that represent production actions controlled by the manufacturing execution system;

c) defining within the segment requirements resources required to produce the required quantity of the predetermined product;

d) defining a rescaling attribute and aligning the rescaling attribute with each of the resources in a production request tree stored in a database which includes an interface to the manufacturing execution system; and e) using an user interface of the manufacturing execution system to update the quantity of the predetermined product to be produced and recalculating in response to the update the resources required to produce the updated quantity of the predetermined product by applying at database level a rescaling factor calculated from the original quantity and the updated quantity as input variable for the rescaling attributes.

With respect to the system the objective is achieved according to the present invention by a system for propagating a scaling mode in a production process controlled and executed by a manufacturing executing system (MES). The system containing:

a) an interface within the manufacturing execution system enabled to provide a production request in terms of a quantity of a predetermined product to be produced;
b) a data processing device in order to identify the predetermined product by a predetermined production rule thereby dividing the production rule in a number of segment requirements that represent production actions controlled by the manufacturing execution system;
c) the data processing device further defining within the segment requirements resources required to produce the required quantity of the predetermined product;
d) the data processing device having a module to define a rescaling attribute, such as a rescaling formula or a Boolean function, and to align the rescaling attribute with each of the resources in a production request tree stored in a database which contains an interface to the manufacturing execution system;
e) the interface being used to update the quantity of the predetermined product to be produced;
f) the data processing device being used to recalculate in response to the update the resources required to produce the updated quantity of the predetermined product by applying at database level a rescaling factor calculated from the original quantity and the updated quantity as input variable for the rescaling attributes; and
g) using the recalculated resources controlled by the manufacturing execution system in order to produce the quantity of the product according to the updated production request.

Both the method and the system now take away the burden from the MES system to provide update calculations for the resources required in the updated production request. Since the formulas for the update are maintained in the database in terms of the rescaling attributes, the data communications invoked by this update is limited to one single user interface call to update the quantity of the production request. Any update of the resources is then subsequently done in the database through the production request hierarchy, because all the data are already in the database (production request data and formulas) and the MES system is free to perform other tasks.

A suitable means for the installation of the production request hierarchy can be realized by considering the production request as the master table and each segment requirement as a child table depending from the master table, both contained in the database.

A suitable way to manage the relationship between the master table and the child tables can be established by a production request identity associated with the production request, wherein the production request identity is traceable in the child tables by SQL database function. In other words, the child table may include various production requirement data but by associating a production request identity with each individual line of production requirement allows to filter those lines of data to be updated achieving thereby the propagation of the rescaling of the initial production request.

In order to cope with the complexity of the production plant where very often resources show a non-linear behavior as compared to the modification of the production request, with each production requirement an individual rescaling attribute can be defined. This means for example to realize for specific resources an asymptotic behavior when increasing the quantity of the production request. Typically, the rescaling attribute in this regard may be selected from a group consisting of a linear function, a non-linear function and a Boolean function.

Other features which are considered as characteristic for the invention are set forth in the appended claims.

Although the invention is illustrated and described herein as embodied in a method and a system for propagating a scaling mode in a production process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a table showing a production request master table and a production requirement table;

FIG. 4 is a table showing the production request master table and the production requirement table after an update of a production request.

DETAILED DESCRIPTION OF THE INVENTION

Figure 5:
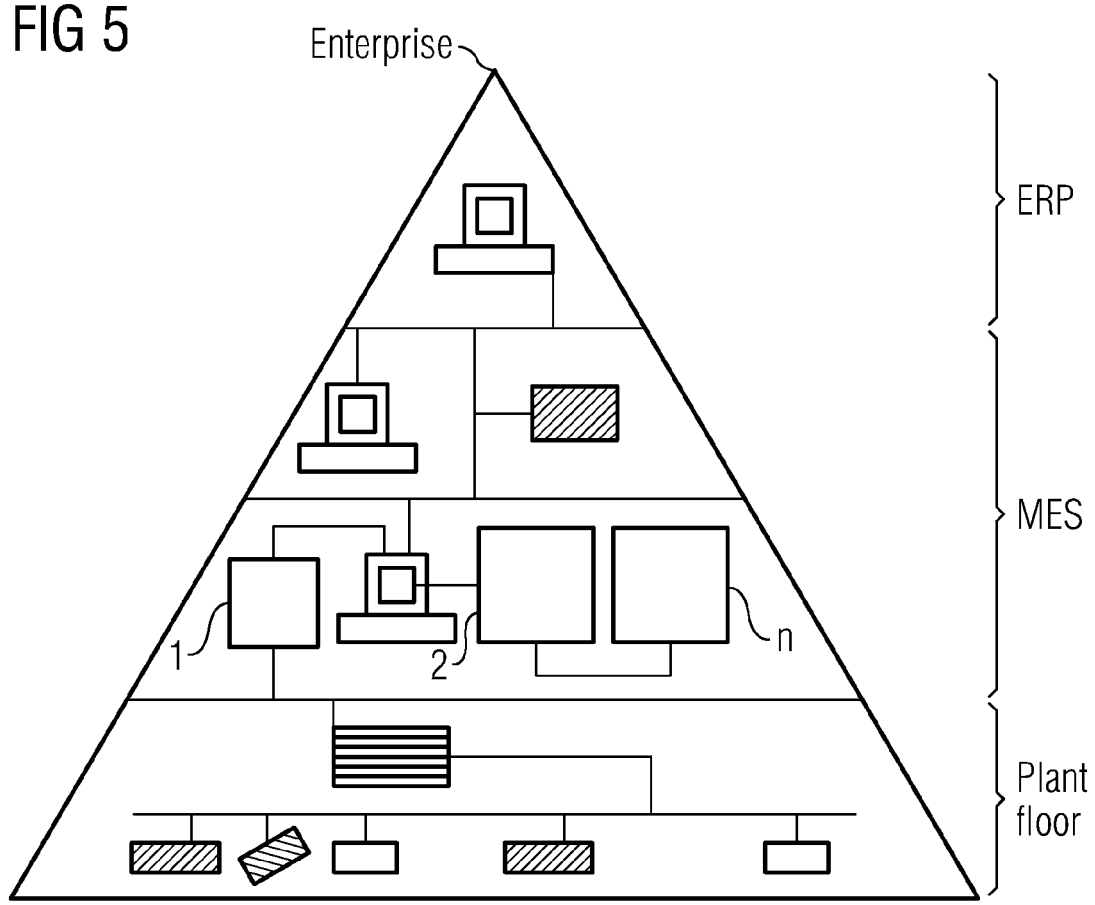
FIG. 5 is an illustration showing the design of a MES system and its environment in an enterprise.

As schematically represented in FIG. 5, a manufacturing execution system MES is an intermediate layer providing computing machines and software tools 1 to n between an ERP upper layer and a plant floor lower layer, including a software tool for production order management 1, which receives requests of production from the ERP, and a software tool for production modeling 2, which supports the phases of selecting and managing the resources to be involved in the manufacturing processes, i.e. employees, machines and materials, in order to realize a planned manufacturing process within required time constrains.

MES is based on the International Standard Association (ISA) standard S95 which defines how software tools 1 to n may implement the production at a plant floor level and how it communicates. More particularly, S95 is substantially based on a manufacturing process represented by a plurality of sequential process segments wherein each sequential process segment contains a plurality of actions to be performed sequentially at the plant floor level. Each process segment contains at least one production requirement such as machine time, personnel, starting and intermediate materials.

An execution of the MES software tool described above includes the management of the manufacturing process by activating a sequential process segment and sequentially executing the corresponding plurality of actions.

More particularly, in order to complete a manufacturing process, the software tool for production order management 1 substantially repeats the steps of activating and waiting the end of a plurality of sequential process segments, for a plurality of process segments. In this case, a plurality of software tools, corresponding to respective sequential process segments, is executed, for the duration of the corresponding sequential process segment.

A MES also contains a scheduling and planning tool. The scheduling tool contains applications which provide a set of optimization techniques by use of built-in algorithms that operate on data coming from the plant floor lower layer. The main goal of optimization techniques of a scheduling tool is the capability of coping with a large number of customer requirements and providing efficient scheduling results in short computing time in order to achieve best efficient plant resources use.

As explained above, it turns out that during a production process controlled by the MES the production request has to be modified for various reasons, i.e. change of order by the customer, shortage of starting material, break-down of a machine, shortage of personnel and so on. Any modification on the quantity of the production request leads to a necessity to propagate this modification into the management of the resources that have been or have to be involved in the production of the request product. It is therefore essential for the performance of the MES that the recalculation of the resources doesn't have to be executed within the MES because this activity would require a broad variety of database round trips in order to update the respective data.

Figure 1:
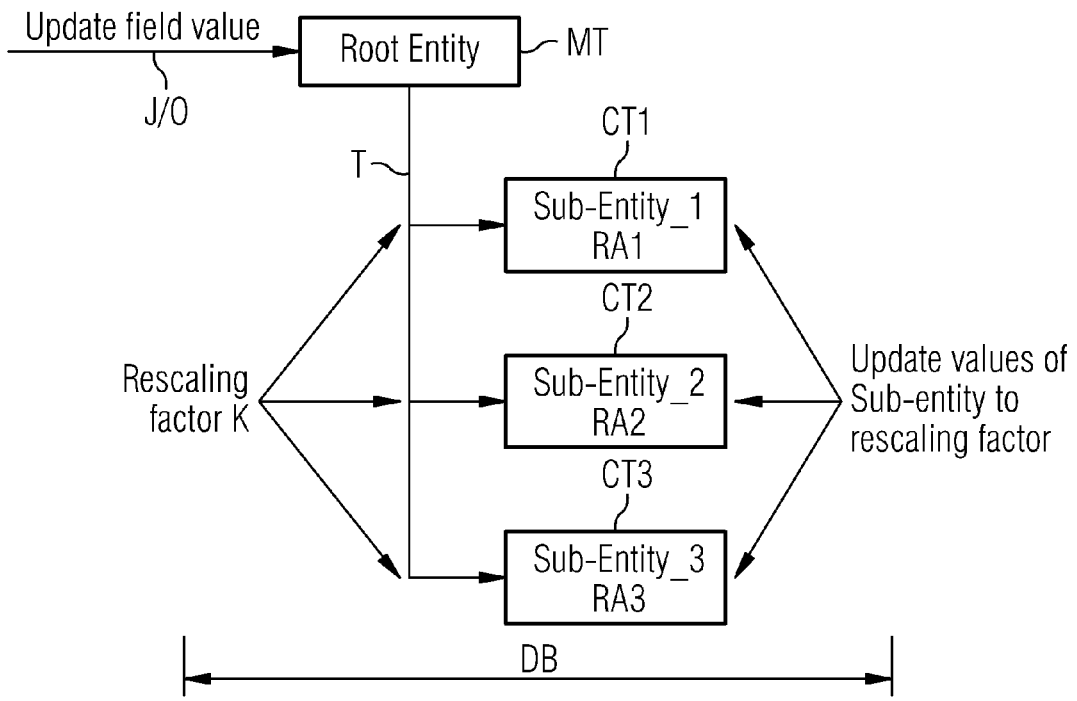
FIG. 1 is an illustration showing a structure of a rescaling process involving a master table and three child tables according to the invention.
Figure 2:
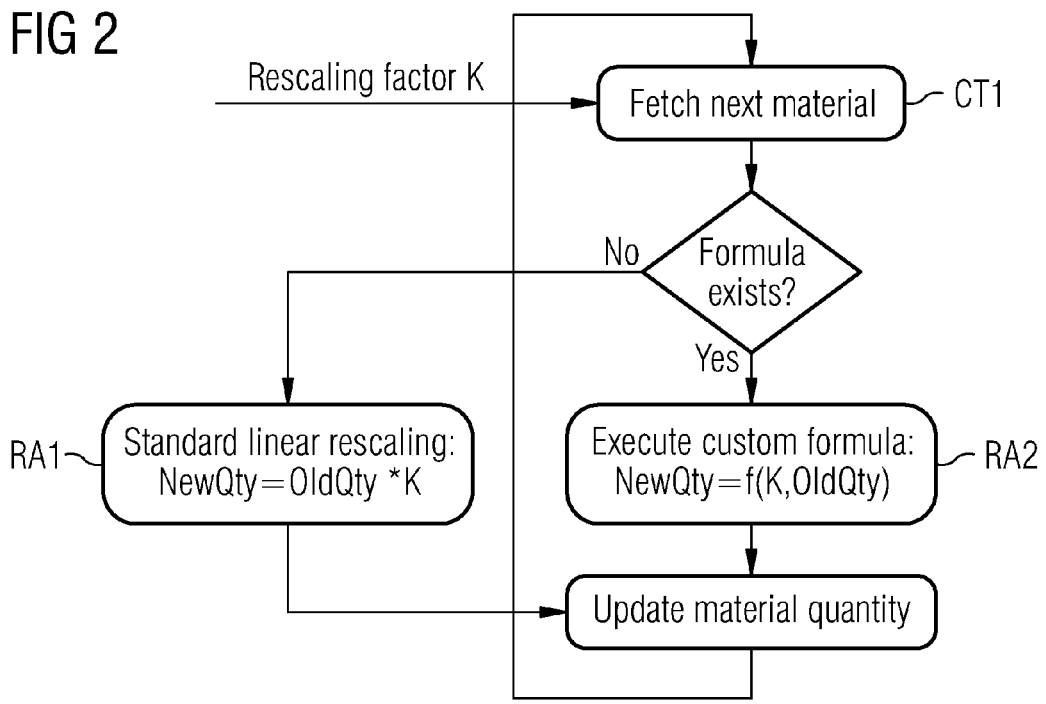
FIG. 2 is an illustration showing the logic of the rescaling process within a child table.

The inventive method and system are hereinafter described with reference to FIGS. 1 and 2. The initial production request is therefore programmed as a root entity or in other words as a master table MT contained in a database. Therefore, the product to be produced is identified within the MES system by a predetermined production rule thereby dividing the production rule in a number of segment requirements that represent production actions controlled by the manufacturing execution system MES. Within the segment requirements, the resources required to produce the required quantity of the predetermined product are identified and shown in FIG. 1 as Sub-Entity_1 to 3 or in other word as child tables CT1 to CT3 maintained in the database DB, which is for example a relational SQL data base.

Within the database DB a rescaling attribute RA1 to RA3 is defined and aligned with each of the resources Sub-Entity_1 to 3 in a production request tree T stored in the database DB which contains an interface I/O to the manufacturing execution system MES. It has to be noted that each of the resources Sub-Entity_1 to 3 may have its own rescaling attribute RA1 to RA3. Using now the user interface I/O connecting the manufacturing execution system MES to the database DB to update the quantity of the predetermined product to be produced a recalculation is made in response to the update related to the resources Sub-Entity_1 to 3 required to produce the updated quantity of the predetermined product. This recalculation is done by applying at database level a rescaling factor K calculated from the initial quantity OLDQty and the updated quantity NEWQty as input variable for the rescaling attributes RA1 to RA2. The rescaling attributes RA1 to RA3 can be a linear function for cutting the use of a resource by half in case the quantity of the production request is cut by half (K=0.5). The rescaling attribute could also be a non-linear function, such as an exponential or logarithmic function, or a Boolean function indicating for example whether the USE of a machine=TRUE or FALSE after a reduction or an increase of the quantity to be produced. FIG. 2 illustrates the flow during the propagation. A child table CT1 representing "Fetching next material" receives the information of the rescaling factor K. The database controller is then querying whether the rescaling attribute is a specific formula, here rescaling attribute RA2, or just a standard linear rescaling, here rescaling attribute RA1.

The rescaling attribute identified is then applied to the initial quantity OLDQty to calculate updated quantity NEWQty. This process is done for any child table CT1 to CT3 existing in the database DB with respect to the master table MT. Therefore, this database round trip is an internal measure within the MES system which does not burden the MES. Any data required by the MES for the fulfillment of the production request is subsequently loaded from the database DB in terms of the updated quantity for each of the resources used.

FIG. 3 illustrates a master table MT containing two production request 1 and 2 and the respective quantity and a child table CT containing the respective resource Entry1 to Entry3, the production request identity, the quantity to be produced with this resource and the duration of the resource use combined with the rescaling attribute as formula ID.

FIG. 4 illustrates the situation after an update of production request 1. The desired quantity has been doubled from 14 to 28. A modified master table MT' reflects the updated production request1. A modified child table CT' reflects this update for the resources Entry1 and Entry2 which have been aligned with the production request 1. In this table, the production request identity stays the same, but the quantity to be produced with this resource and the duration of the resource use is double due to the application of rescaling factor K=2 to the linear standard rescaling attribute RA1.

The invention claimed is:

1. A system for propagating a scaling mode in a production process controlled and executed by a manufacturing executing system (MES), the system comprising:
    an interface within the manufacturing execution system (MES) enabled to provide a production request in terms of an initial quantity of a predetermined product to be produced;
    a data processing device for identifying the predetermined product by a predetermined production rule thereby dividing the production rule in a number of segment requirements that represent production actions controlled by the manufacturing execution system;
    said data processing device defining within the segment requirements resources required to produce a required quantity of the predetermined product;
    a database having an interface to the manufacturing execution system;
    said data processing device having a module for defining a rescaling attribute, including a rescaling formula or a Boolean function, and to align the rescaling attribute with each of the resources in a production request tree stored in said database;
    a man machine interface for updating a quantity of the predetermined product to be produced; and
    said data processing device recalculating in response to an update the resources required to produce an updated quantity of the predetermined product by applying at a database level a rescaling factor calculated from the initial quantity and the updated quantity as an input variable for rescaling attributes and using recalculated resources controlled by the manufacturing execution system to produce the quantity of the product according to an updated production request.

2. The system according to claim 1, wherein the production request is considered a master table and each segment requirement is considered a child table depending from the master table, both contained in said database.

3. The system according to claim 2, wherein a relationship between the master table and child tables is established by a production request identity associated with the production request, wherein the production request identity is traceable in the child tables by an SQL database function.

4. The system according to claim 1, wherein with each production requirement an individual rescaling attribute is definable.

5. The system according to claim 4, wherein the rescaling attribute is selected from the group consisting of a linear function, a non-linear function and a Boolean function.

6. The system according to claim 4, wherein the rescaling attribute (RA1 to RA3) is selected from the group consisting of a rescaling formula and a Boolean function.

* * * * *